United States Patent
Hanabusa et al.

(10) Patent No.: US 6,921,747 B2
(45) Date of Patent: Jul. 26, 2005

(54) BASIC AMINO ACID DERIVATIVES

(75) Inventors: Kenji Hanabusa, Nagano (JP); Masahiro Suzuki, Nagano (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 10/777,179

(22) Filed: Feb. 13, 2004

(65) Prior Publication Data

US 2004/0248812 A1 Dec. 9, 2004

(30) Foreign Application Priority Data

Apr. 28, 2003 (JP) .................................. PCT/JP03/05453

(51) Int. Cl.$^7$ .......................... A01N 37/18; A61K 38/00
(52) U.S. Cl. ........................... 514/2; 530/300; 530/323; 530/332; 554/112; 554/106; 554/69; 554/66; 554/57; 554/56; 554/47; 564/153; 564/152
(58) Field of Search ............................. 514/2; 530/300, 530/323, 332; 554/112, 106, 69, 66, 57, 56, 47; 564/153, 152

(56) References Cited

U.S. PATENT DOCUMENTS 4,965,071 A * 10/1990 Kawan ....................... 424/401

FOREIGN PATENT DOCUMENTS

| GB | 1 485 694 | 9/1977 |
|---|---|---|
| JP | 52-66885 | 6/1977 |
| JP | 54-33798 | 10/1979 |
| JP | 55-75493 | 6/1980 |
| JP | 59-77859 | 5/1984 |
| JP | 59-52196 | 12/1984 |
| JP | 60-44968 | 10/1985 |
| JP | 7-247473 | 9/1995 |
| JP | 7-247474 | 9/1995 |
| JP | 8-231942 | 9/1996 |
| JP | 10-226614 | 8/1998 |
| JP | 10-237034 | 9/1998 |
| JP | 10-245396 | 9/1998 |
| JP | 10-273477 | 10/1998 |
| JP | 2000-256303 | 9/2000 |
| JP | 2000-344620 | 12/2000 |
| WO | WO 00/53576 | 9/2000 |

OTHER PUBLICATIONS

M Suzuki, et al. Chem. Comm. Supplementary Material (2001) 1–4.*
I Gachard, et al. Macromol Chem. Phys. (1997) 198, 1375–1389.*
Amihope Functional Powder http://www.ajinomoto.co.jp/e_aminoscience/cosmetics/funtional.html. Accessed Oct. 21, 2004. 1 page.*
Ajinomoto http://www.chembuyersguide.com/partners/ajinomoto.html. Accessed Oct. 21, 2004. 4 pages.*
Cosmetic and Toiletry Formulations, vol. 5 (2nd Edition) ©1996. p. 591.*
D. Ranganathan, et al., *J. Peptide Res.*, vol. 51, pp. 297–302 (1998).
S. Franceschi, et al., *New J. Chem.*, vol. 23, pp. 447–452 (1999).
J. Makarevic, et al., *Chem. Eur. J.*, vol. 7, No. 15, pp. 3328–3341 (2001).
M. Suzuki, et al., *Org. Biomol. Chem.*, vol. 1, pp. 4124–4131 (2003).
M. Suzuki, et al., *Tetrahedron Letters*, vol. 44, pp. 6841–6843 (2003).

* cited by examiner

*Primary Examiner*—Bruce R. Campell
*Assistant Examiner*—Andrew D. Kosar
(74) *Attorney, Agent, or Firm*—Oblon, Spivak, McClelland, Maier & Neustadt, P.C.

(57) ABSTRACT

The present invention provides a basic amino acid derivative represented by the formula (1):

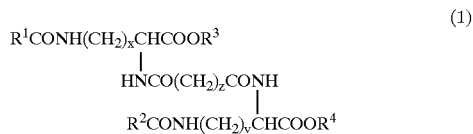

The present invention also provides a method of making a gelled product by employing the aforementioned compound, as well as a gel, perfumery, and/or cosmetic containing the same.

20 Claims, No Drawings

BASIC AMINO ACID DERIVATIVES

TECHNICAL FIELD

The present invention relates to basic amino acid derivatives which are useful for gelling or solidifying various organic medium, etc. which is liquid at ambient temperature and also relates to a gelling agent, a solidifying agent, gel and a perfumery/cosmetic containing at least one of them.

BACKGROUND ART

A method where fluidity of various kinds of cosmetics/perfumeries, pharmaceuticals, agricultural chemicals, adhesives, resins, paints, etc. which are liquid at ambient temperature is controlled so as to process into a form being fit for the purpose of diversified uses is a very important art in industry. In addition, disaster and marine pollution by accident caused by spilled oil are becoming severe social problems but, if oil is able to be solidified, it is possible not only to prevent diffusion of oil but also to easily and efficiently recover it and a gelling treatment of spilled oil is able to be a very effective means for prevention of spilled oil. Moreover, waste edible oil coming out from ordinary households is a cause for the pollution of quality of water and, if the waste oil can be gelled by a simple method and discarded as a solid, its harmful influence on environment is able to be reduced.

With regard to a substance having a function of controlling the fluidity and viscosity of liquid substances as such, there have been known alkaline metal salts of long-chain fatty acids (Patent Document 1: JP-A-55-75493), metal soaps (Patent Document 2: JP-B-59-52196), 12-hydroxystearic acid (Patent Document 3: JP-B-60-44968), condensates of polyhydric alcohols with benzaldehyde (Patent Document 4: JP-A-59-77859), N-acylamino acid amides (Patent Document 5: JP-B-54-33798), etc.

Among them, alkaline metal salts of long-chain fatty acids and metal soaps required much adding amount for gelling or solidifying the liquid organic medium. In addition, with regard to 12-hydroxystearic acid, types of organic medium being able to be solidified are little and gelling ability thereof is low as well and, therefore, the resulting gel has weak strength, is fragile and is apt to be crumbled whereupon it is insufficient in terms of stability of the gel around ambient temperature. On the other hand, although condensates of polyhydric alcohols with benzaldehyde represented by dibenzylidene sorbitol are able to make many organic media into gel, there is a restriction in the joint use with a low-boiling substance or a substance which is not so resistant to heat because their dissolving temperature is high. In addition, there is a disadvantage that the acetal moiety in the condensate is unstable and is decomposed. Although N-acylamino acid amides represented by N-lauroyl-L-glutamic acid α,γ-di-n-butylamide are able to gel or solidify many organic media in small adding amount and strength of the resulting gel is high as well, their gelling ability to lower alcohol such as methanol is poor and they do not always have a satisfactory gelling ability.

In order to improve the disadvantages as mentioned above, development of gelling agents or solidifying agents for organic media has been briskly carried out in recent years. Examples thereof are cyclohexane tricarboxamide (Patent Document 6: JP-A-10-273477), bis(acylamino) cyclohexane derivatives (Patent Document 7: JP-A-10-237034), oligopeptide alkylamide derivatives (Patent Document 8: JP-A-10-245396; Patent Document 9: JP-A-10-226614), dialkylurea derivatives prepared by the reaction of diaminocyclohexane with alkyl isocyanate (Patent Document 10: JP-A-8-231942), cyclic dipeptides (Patent Document 11: JP-A-7-247474); Patent Document 12: JP-A-7-247473), $N^\alpha$-alkyl or alkenylcarbamoyl-$N^\omega$-acylamino acid ester compounds (Patent Document 13: JP-A-2000-256303), etc. They are able to gel or solidify various kinds of liquid organic media in small additional amount, strength of the resulting gel is strong and stability around the ambient temperature is good as well. On the other hand however, gelling ability is greatly affected by steric configuration of the compound whereby synthesis and separation of the material having a specific steric configuration are difficult, availability of the material is difficult or, in the manufacture, there are many reaction steps and the process is complicated whereby there is a problem in productivity.

Further, $N^\alpha$-alkyl or alkenylcarbamoyl-$N^\omega$-acylamino acid ester compounds (Patent Document 13: JP-A-2000-256303) are disclosed as gelling agents or solidifying agents for varieties of organic media such as lower alcohol, chlorine-type solvents or hydrocarbon oils. Even by them however, there is a variation in the gelling ability depending upon the type of the organic medium such as that, as compared with hydrocarbon oil, the gelling ability for lower alcohol or chlorine-type solvent is low.

DISCLOSURE OF THE INVENTION

Matters to be solved by the present invention is to provide a gelling agent or a solidifying agent which is able to gel or solidify various kinds of liquid organic media or liquid aqueous media in a small adding amount and which is also able to be manufactured easily.

The present inventors have carried out extensive investigations for solving the above-mentioned problems and found that the basic amino acid derivative represented by the following formula (1) has an excellent gelling ability to various kinds of liquid organic media or liquid aqueous media and is also able to be manufactured easily whereupon the present invention has been achieved. Thus, the present invention is as follows.

[1] A basic amino acid derivative represented by the following formula (1).

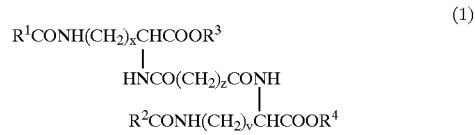

(In the formula, $R^1$ and $R^2$ each independently is a straight-chain or branched-chain alkyl or alkenyl group having 5 to 21 carbon atoms, $R^3$ and $R^4$ each independently is an alkyl or alkenyl group having 1 to 22 carbon atom(s), hydrogen atom, alkaline metal or alkaline earth metal in which the alkyl or alkenyl group may be either in straight-chain or branched-chain or may have a cyclic structure, z is an integer of 0 or more and x and y each is an integer of 2 to 4.)

[2] The basic amino acid derivative according to the above [1], wherein z in the above formula (1) is 0 to 10.

[3] The basic amino acid derivative according to the above [1], wherein z in the above formula (1) is 0.

[4] The basic amino acid derivative according to the above [1], wherein $R^1$ and $R^2$ each in the above formula (1) is a straight-chain alkyl group having 11 carbon atoms.

[5] The basic amino acid derivative according to the above [1], wherein $R^3$ and $R^4$ each in the above formula (1) is an alkaline metal or an alkaline earth metal.

[6] A gelling agent or a solidifying agent which is characterized in containing at least one member of the basic amino acid derivative mentioned in the above [1].

[7] Gel which is characterized in containing at least one member of the basic amino acid derivative mentioned in the above [1].

[8] A perfumery/cosmetic which is characterized in containing at least one member of the basic amino acid derivative mentioned in the above [1].

In accordance with the present invention, it is now possible that various kinds of liquid organic media are able to be gelled or solidified using a small adding amount of the basic amino acid derivative represented by the above formula (1). Especially in the case of alkaline metal such as sodium and potassium, alkaline earth metal such as magnesium and calcium and a mixed metal thereof, it is possible that not only liquid organic medium but also liquid aqueous medium is gelled. According to the present invention, it is also possible to provide a gelling agent or a solidifying agent which is able to be synthesized by a simple method. In addition, a gelled product formed by the use of the basic amino acid derivative of the present invention has an excellent stability for a long period around the ambient temperature.

In the production and processing of a product group including liquid organic media or liquid aqueous medium being exemplified by perfumeries/cosmetics, pharmaceuticals, agricultural chemicals, adhesives, resins, paints, etc. which are liquid, the present invention is useful for the control of fluidity of the liquid organic media or liquid aqueous media and for the processing into a form being fit for the purpose of diversified uses. Further, the present invention is preferably applicable in the field of environmental preservation such as a gelling treatment of spilled oil in the sea and a gelling treatment of waste oil coming out of ordinary households.

BEST MODE FOR CARRYING OUT THE INVENTION

The present invention provides a basic amino acid derivative represented by the above formula (1), a gelling agent or a solidifying agent in which the above is an effective ingredient and gel and perfumery/cosmetic containing the above. Incidentally, the compound represented by the above formula (1) may also be called a basic amino acid derivative of a tandem type.

$R^1$ and $R^2$ each independently is a straight-chain or branched-chain alkyl or alkenyl group having 5 to 21 carbon atoms. The carbon atom numbers of R and R 2 each are preferably 7 to 11.

$R^3$ and $R^4$ each independently is an alkyl or alkenyl group having 1 to 22 carbon atom(s), hydrogen atom, alkaline metal or alkaline earth metal. Structure of the above alkyl or alkenyl group may be either in straight-chain or branched-chain or may have a cyclic structure. In view of a gelling ability, it is preferred to be in a branched structure while, in the case of a straight chain, there is a tendency that the less the carbon numbers, the better. The above alkaline metal may be sodium, potassium or a mixture thereof while the above alkaline earth metal may be magnesium, calcium or a mixture thereof.

z is an integer of 0 or more, preferably 0 to 10 and, particularly preferably, 0.

The basic amino acid derivative of the present invention may be synthesized by a generally known common methods using the above-mentioned $N^\omega$-acylamino acid, alcohol and fatty acid chloride having carboxyl groups at both ends as starting materials. For example, it is able to be synthesized by such a manner that esterification of a carboxylic acid moiety of the $N^\omega$-acylamino acid is firstly carried out according to an esterification reaction such as a dehydrating condensation upon heating (at ordinary pressure or in vacuo), a transeterification reaction or an azeotropic dehydrating condensation reaction with an alcohol either in the presence or absence of a catalyst and then the resulting $N^\omega$-acylamino acid ester compound is made to react with a one-half equivalent of a fatty acid chloride having carboxyl groups at both ends in an inert solvent in the presence or absence of a catalyst. Instead of the above method, it is of course possible to conduct a method where an $N^\omega$-acylamino acid is firstly made to react with a fatty acid chloride having carboxyl groups at both ends and then the product is esterified. It is further acceptable that the substance is not esterified.

The basic amino acid derivative prepared by the above-mentioned method is further made to react with an alkaline metal hydroxide, an alkali earth metal hydroxide, etc. to substitute the $R^3$ and $R^4$ moieties with alkaline metal and/or alkaline earth metal whereupon it is possible to convert the above to a basic amino acid derivative where $R^3$ and $R^4$ are alkaline metals and/or alkaline earth metals.

In some cases, unreacted materials may remain in the reaction product prepared as such and the product may be purified by known methods such as extraction, recrystallization and chromatography. When there is no influence on a gelling ability, the product in a state of the mixture per se may be used.

Examples of the $N^\omega$-acylamino acid are $N^\epsilon$-acyllysine, $N^\delta$-acylornithine and $N^\gamma$-acyl-α,γ-diaminobutyric acid and, among them, $N^\epsilon$-acyllysine is most preferred.

With regard to the acyl group ($R^1$ and $R^2$) in the $N^\omega$-acylamino acid, that which is derived from a straight-chain or branched-chain and saturated or unsaturated fatty acid having 5 to 21 carbon atoms is preferred and its examples are long-chain acyl groups derived from octanoic acid, decanoic acid, lauric acid, palmitic acid, stearic acid, oleic acid, etc. When carbon numbers of the acyl group are 22 or more, a gelling ability becomes poor in some cases and that is not adequate.

The $N^{107}$-acylamino acid may be easily synthesized by, for example, subjecting a basic amino acid and a long-chain fatty acid to dehydration by heating. An example of the commercially available $N^{107}$-acylamino acid is AMIHOPE LL ($N^\epsilon$-lauroyl-L-lysine) manufactured by Ajinomoto.

The $N^\omega$-acylamino acid may be either an optically active substance or a racemic substance and, in view of an improvement in a gelling ability, the optically active substance is preferred. In addition, it may be used either solely or two or more thereof may be used as a mixture.

The alcohol ($R^3$ and $R^4$) used for esterification of $N^\omega$-acylamino acid is a saturated or unsaturated and straight-chain, branched-chain and/or cyclic alcohol having 1 to 22 carbon(s) and its examples are methanol, ethanol, n-propanol, isopropanol, n-butanol, 2-butanol, n-pentanol, n-hexanol, cyclohexanol, n-heptanol, n-octanol, 2-ethylhexanol, n-nonanol, n-decanol, lauryl alcohol, myristyl alcohol, palmityl alcohol, stearyl alcohol, oleyl alcohol, isostearyl alcohol, behenyl alcohol and 2-octyldodecanol. It is also possible that no esterification is conducted. When carbon numbers are more than 22, the resulting gelling ability may be poor in some cases and that is not adequate.

Examples of the metal ($R^3$ and $R^4$) utilized for carboxylic acid neutralized salts of the basic amino acid derivative of the present invention are alkaline metal such as sodium potassium, alkaline earth metal such as magnesium and calcium and a mixed metal thereof. From the viewpoint that both liquid organic media and aqueous media are gelled, an alkaline metal salt is preferred and, from the viewpoint of gel strength, a monoalkaline metal salt is particularly preferred.

There is no particular limitation for a dicarboxylic acid chloride which is used for the reaction of two molecules of $N^\omega$-acylamino acid alkyl ester with a fatty acid chloride having carboxyl groups at both ends and its examples are oxalyl chloride, malonyl chloride, succinyl chloride, glutaryl chloride, adipoyl chloride, pimeloyl chloride, suberoyl chloride, azelaoyl chloride, sebacoyl chloride and dodecanedioyl chloride. That where carbon number(s) (z) of the methylene chain is/are 0 to 10 is preferred and that where it is 0 is most preferred. It may be used either solely or two or more thereof may be used as a mixture.

The present invention further provides a gelling agent or a solidifying agent where the basic amino acid derivative represented by the above-mentioned formula (1) is an effective ingredient. In the gelling agent or solidifying agent of the present invention, it is sufficient that at least one member of the above-mentioned basic amino acid derivative of the present invention is used as an effective ingredient and the case where two or more thereof are mixed is acceptable as well. It is also possible that other gelling agent or solidifying agent is added to the gelling agent or solidifying agent of the present invention so far as that does not deteriorate the advantage of the present invention. Examples of other gelling agent or solidifying agent are N-acyl-L-glutamic acid dialkylamide, polyamide resin, 12-hydroxystearic acid, sodium stearate, dibenzylidene-D-sorbitol, fatty acid dextrin and gelatin. The gelling agent or solidifying agent of the present invention may also contain other components such as substrate material and auxiliary agent. Examples of other components are surface-active agent, additive and powder.

Examples of the surface-active agents are anionic surface-active agent such as N-long-chain acylamino acid salt (e.g., N-long-chain acyl acidic amino acid salt and N-long-chain acyl neutral amino acid salt), N-long-chain fatty acid acyl-N-methyltaurine salt, alkyl sulfate and alkylene oxide adduct thereof, fatty acid amide ether sulfate, fatty acid metal salt and weakly basic salt, sulfosuccinate-type surface-active agent, alkyl phosphate and alkylene oxide adduct thereof and alkyl ether carboxylic acid; nonionic surface-active agent such as ether-type surface-active agent (e.g., glycerol ether and alkylene oxide adduct thereof), ester-type surface-active agent (e.g., glycerol ester and alkylene oxide adduct thereof), ether-ester-type surface-active agent (e.g., sorbitan ester and alkylene oxide adduct thereof), ester-type surface-active agent (e.g., polyoxyalkylene fatty acid ester, glycerol ester, fatty acid polyglycerol ester, sorbitan ester and sucrose fatty acid ester), nonionic surface-active agent of a nitrogen-containing type (e.g., alkylglucoside, hydrogenated castor oil pyroglutamic acid ester and ethylene oxide adduct thereof and fatty acid alkanolamide); cationic surface-active agent (e.g., aliphatic amine salt including alkylammonium chloride and dialkylammonium chloride), quaternary ammonium salt thereof, aromatic quaternary ammonium salt including benzalkonium salt and fatty acid acylarginine ester; and amphoteric surface-active agent such as betaine-type surface-active agent (e.g., carboxybetaine), aminocarboxylic acid-type surface-active agent and imidazoline-type surface-active agent; etc.

Examples of various additives are amino acid such as glycine, L-alanine, DL-alanine, serine, threonine, arginine, glutamic acid, aspartic acid, leucine and valine; polyhydric alcohol such as glycerol, ethylene glycol, 1,3-butylene glycol, propylene glycol and isoprene glycol; water-soluble polymer such as polyamino acid including polyglutamic acid and polyaspartic acid as well as salt thereof, polyethylene glycol, acacia, alginate, xanthan gum, hyaluronic acid, hyaluronate, chitin, chitosan, water-soluble chitin, carboxyvinyl polymer, carboxymethyl cellulose, hydroxyethyl cellulose, hydroxypropyltrimethylammonium chloride, poly (dimethylmethylenepiperidium chloride), quaternary ammonium salt of polyvinylpiperidone derivative, cationized protein, decomposed collagen and derivative thereof, acylated protein and polyglycerol; sugar alcohol such as mannitol and alkylene oxide adduct thereof; and lower alcohol such as ethanolandpropanol. Still more examples are animal and plant extracts, nucleic acid, vitamin, enzyme, anti-inflammatory agent, bactericide, antiseptic, antioxidant, ultraviolet-absorber, chelating agent, antiperspirant, pigment, dye, oxidation dye, organic and inorganic powders, pH-adjusting agent, pearling agent and moisturizer.

Examples of various powders are resin powder such as Nylon beads and silicone beads, Nylon powder, metal fatty acid soap, yellow iron oxide, red iron oxide, black iron oxide, chromium oxide, cobalt oxide, carbon black, ultramarine blue, Prussian blue, zinc oxide, titanium oxide, zirconium oxide, silicon oxide, aluminum oxide, cerium oxide, mica titanium, boron nitride, barium sulfate, calcium carbonate, magnesium carbonate, aluminum silicate, magnesium silicate, silicon carbide, pigment, lake, sericite, mica, talc, kaolin, barium sulfate with a plate shape, barium sulfate with a butterfly shape, fine particles of titanium oxide, fine particles of zinc oxide, fine particles of iron oxide and acylamino acid such as acyllysine, acylglutamic acid, acylarginine and acylglycine. Those which are subjected to a surface treatment such as treatment with silicone, with a fluorine compound, with a silane coupling agent, with silane and an organic titanate, with an acylated lysine, with a fatty acid, with a metal soap, with an oil and with an amino acid may be acceptable as well.

The basic amino acid derivative of the present invention has an excellent action of gelling or solidifying various kinds of liquid organic media by addition of small amount thereof. Examples of the liquid organic media mentioned here are mineral oil such as gasoline, kerosene, light oil and heavy oil; animal oil such as whale oil and herring oil; plant oil such as soybean oil, olive oil, castor oil, linseed oil, corn oil, sunflower oil, rapeseed oil and cotton seed oil; hydrocarbon such as petroleum benzin, liquid paraffin, benzene, toluene, hexane and cyclohexane; ester such as ethyl acetate, butyl acetate, amyl acetate, diethyl sebacate, dioctyl sebacate, diethyl phthalate, dioctyl phthalate and polyoxyalkylene glycol fatty acid ester; ether such as diglyme and polyalkylene glycol ether; cyclic ether such as THF and dioxane; ketone and aldehyde such as acetone, methyl ethyl ketone, methyl isobutyl ketone, cyclohexanone and anisaldehyde; lower alcohol such as methanol, ethanol, propanol and butanol; silicone oil such as methyl polysiloxane, methylphenyl polysiloxane, octamethyl cyclotetrasiloxane and decamethyl cyclopentasiloxane; halogen such as chlorobenzene and carbon tetrachloride; and highly polar organic solvent such as DMF and DMSO. Thus, the present invention is effective to a very wide range of liquid organic media regardless of combustible and incombustible and is also effective to a medium where such liquid organic media are mixed or are main components. In addition, the liquid organic medium may be either in a completely dissolved state or in a suspended state. Incidentally, the above-mentioned liquid organic medium may contain a liquid aqueous medium within such an extent that the advantage of the present invention is not deteriorated. Examples of the liquid aqueous medium mentioned here are water and aqueous solutions containing organic salt or inorganic salt.

When both of the above-mentioned $R^3$ and $R^4$ in the basic amino acid derivative of the present invention are alkaline metal such as sodium and potassium, alkaline earth metal such as magnesium and calcium or a mixed metal thereof, that is particularly preferred in such a respect that not only liquid organic medium but also liquid aqueous medium is able to be well gelled. Examples of the liquid aqueous medium mentioned here are water and an aqueous solution containing organic salt or inorganic salt. Incidentally, the above-mentioned liquid organic medium may contain a liquid organic medium within such an extent that the advantage of the present invention is not deteriorated. From a view point to be easily dissolved in water each other, a liquid water-soluble organic medium is preferred. Examples of the liquid water-soluble organic medium mentioned here are lower alcohol such as methanol, ethanol, propanol and butanol; polyhydric alcohol such as ethylene glycol, propylene glycol, glycerol, 1,3-butylene glycol and polyethylene glycol; etc.

When the basic amino acid derivative of the present invention is added to a liquid organic medium or a liquid aqueous medium, heated with stirring, if necessary, at about 50 to 120° C. so as to give a homogeneous state and allowed to stand at ambient temperature, it is possible to prepare a gelled or solidified product. Although it depends on the type of a liquid organic medium or a liquid aqueous medium to be gelled or solidified, amount of the compound of the present invention used therefor is 1 to 400 part(s) by weight, preferably 1 to 200 part(s) by weight, more preferably 1 to 100 part(s) by weight or, still more preferably, 2 to 80 parts by weight to 1,000 parts by weight of the liquid medium. When the amount used is less than 1 part by weight, a sufficient gelling is not achieved while, when it is more than 400 parts by weight, a part of the gelling agent is crystallized and separated out upon gelling and, therefore, a non-homogeneous state is resulted, appearance is not good and stable gel strength is unable to be maintained whereupon that is not appropriate. Incidentally, hardness of the solidified product can be freely adjusted by the adding amount of the compound of the present invention.

Accordingly, the basic amino acid derivative of the present invention is able to be synthesized by a simple method from an easily available material which is industrially manufactured. When the basic amino acid derivative of the present invention is added to perfumery/cosmetic, pharmaceutical, agricultural chemical, adhesive, resin, paint, etc. containing the above-mentioned liquid organic medium or liquid aqueous medium, it is possible to control the fluidity thereof or, in other words, to form the gel. In addition, the present invention is preferably applicable in the field of environmental preservation such as a gelling treatment of spilled oil in the sea, etc. and a gelling treatment of waste oil coming out from ordinary households as well. Especially in view of a material of an amino acid type, its application to perfumery/cosmetic is preferred. Although there is no particular limitation for the perfumery/cosmetic, its examples are gel cosmetic, pack cosmetic, granular cosmetic, sticky cosmetic and gel fragrance.

EXAMPLES

The present invention will now be specifically illustrated by way of the following examples although the present invention is not limited thereto.

Manufacturing Example 1

Synthesis of bis($N^\epsilon$-lauroyl-L-lysine)oxalyl amide $N^{68}$-Lauroyl-L-lysine (AMIHOPE LL; manufactured by Ajinomoto) (19.71 g, 60 mmol) was dissolved in 600 ml of a 2 wt % aqueops solution of NaOH and ethyl ether was added thereto. Freshly distilled oxalyl chloride (3.81 g, 30 mmol) was slowly added to the ether layer. The two-layered solution was stirred for about 1 hour by keeping at 0° C. and, after that, it was stirred for 23 hours at room temperature. The resulting white precipitate was filtered, well washed with water and dried. The resulting crude product was purified by recrystallizing twice from methanol-ether. Its data by elementary analysis, IR, NMR, etc. supported the structure. Result of the IR measurement is shown below.

Result of IR measurement (KBr): 3317, 1733, 1661, 1640, 1541 cm$^{-1}$

Manufacturing Example 2

Synthesis of Ebis($N^\epsilon$-lauroyl-L-lysine-2-ethylhexyl) oxalyl amide $N^\epsilon$-Lauroyl-L-lysine (20 g, 0.061 mol), 9.54 ml (0.061 mol) of 2-ethylhexanol and 23.2 g (0.122 mol) of p-toluenesulfonic acid monohydrate were heated to reflux together with 300 ml of benzene for two days using a Dean-Stark apparatus where temperature of an oil bath was kept at 130° C. The residue prepared by a vacuum evaporation of excessive benzene was dissolved in 100 ml of THF, 32 g/32 ml (0.230 ml) of morpholine were added thereto and the mixture was stirred. Insoluble matters were filtered and the filtrate was allowed to stand in a refrigerator for about 1 hour. This was filtered and concentrated in vacuo, diethyl ether was added thereto followed by shaking and such an operation was repeated twice. That was concentrated in vacuo and the resulting residue was dried to give 22.04 g of solid.

The above solid (12.3 g) was dissolved in 200 ml of dehydrated THF. To this added were 30 ml (0.014 mol) of dehydrated triethylamine. Under ice-cooling, 2 ml (0.028 mol) of oxalyl chloride were added thereto followed by being allowed to stand for one night at room temperature. The insoluble triethylamine hydrochloride was removed by means of a natural filtration and the filtrate was concentrated in vacuo. The resulting crude product was recrystallized from methanol and diethyl ether to give bis ($N^\epsilon$-lauroyl-L-lysine-2-ethylhexyl)oxalyl amide.

Result of IR measurement (KBr): 3293, 1736, 1646, 1522 cm$^{-1}$

Manufacturing Example 3

Synthesis of bis($N^\epsilon$-lauroyl-L-lysine-3,5,5-trimethylhexylethyl)oxalyl amide It is able to be synthesized by nearly the same method as in Manufacturing Example 2.

Result of IR measurement (KBr): 3319, 3278, 1741, 1662, 1642, 1538 cm$^{-1}$

Manufacturing Example 4

Synthesis of bis($N^\epsilon$-lauroyl-L-lysine)glutarylamide sodium salt

Bis ($N^\epsilon$-lauroyl-L-lysine)glutarylamide (10 mmol) which was synthesized nearly the same method as in Manufacturing Example 1 was dissolved in 300 ml of methanol and 10 ml of 1M aqueous solution of NaOH were added thereto. The resulting solution was evaporated to dryness and the resulting white solid was recrystallized from methanol-ether to give an aimed product.

Result of IR measurement (KBr): 3307, 1716, 1645, 1549 cm$^{-1}$

Manufacturing Example 5

Synthesis of bis($N^\epsilon$-lauroyl-L-lysine)azeraoylamide sodium salt

It is able to be synthesized by nearly the same method as in Manufacturing Example 4.

Result of IR measurement (KBr): 3307, 1715, 1642, 1550 cm$^{-1}$

Test Method 1

The compounds of the present invention (Manufacturing Examples 1 to 3) each was precisely weighed and added to a test tube equipped with a cover, 1 ml of a liquid organic medium was added thereto, the cover was closed and the mixture was heated until the mixture was homogeneously dissolved. After being dissolved, it was allowed to stand for 2 hours in a constant-temperature bath of 25° C. and the state was observed by naked eye. When a gelling was incomplete, the compound was added while, when a completely gelling was noted, the liquid organic medium was added whereupon the minimum amount (mg) of the compound necessary for gelling of each liquid organic medium per ml was determined. However, the maximum amount of the compound which was able to be added was set at 200 mg to 2 ml of the liquid organic medium and the case where the state was liquid or crystals were separated out was evaluated as "not gelled".

Evaluation:

When the amount of a gelling agent necessary for gelling 1 ml of a liquid organic medium was 25 mg or less, it was evaluated as oo; when the amount was 26 to 35 mg, it was evaluated as o; when the amount was 36 to 45 mg, it was evaluated as Δ; and when the amount was 46 mg or more, it was evaluated as x.

were evaluated for various kinds of liquid aqueous media as shown in Table 2 in addition to the liquid organic media.

TABLE 2

| | | Example 4 Compound of Manufacturing Example 4 | Example 5 Compound of Manufacturing Example 5 |
|---|---|---|---|
| Liquid Organic Media | Cyclohexanone | oo | oo |
| | Toluene | oo | oo |
| | DMSO | o | oo |
| | Chloroform | oo | o |
| Liquid Aqueous Media | Water | oo | oo |
| | 0.3% aq NaCl soln | oo | oo |
| | 0.9% aq NaCl soln | oo | oo |
| | Water/ethanol (1/1) | oo | oo |

It is apparent from Table 2 that the basic amino acid derivatives of the present invention are able to gel not only various kinds of liquid organic media but also liquid aqueous media.

Preparation Example 1

Manufacture of Antiperspirant Gel Stick 1) 1.0 g of bis($N^\epsilon$-lauroyl-L-lysine-2-ethylhexyl) oxazylamide 2) 0.5 g of N-2-ethylhexanoyl-L-glutamic acid dibutylamide 3) 7.0 g of 12-hydroxystearic acid 4) 14.0 g of octyldodecanol 5) 48.0 g of cyclomethicone D-5 (SH 245 manufactured by Toray-Dow Corning)

6) 26.0 g of aluminum zirconium trichlorohydrex glycine (Westchlor ZR 30B DM CP-5 of Westwood Chemical Corporation)

The above-mentioned 1) to 5) were dissolved at 130° C., the above-mentioned 6) was added thereto and the mixture was allowed to cool with stirring to give an antiperspirant gel stick. The product had a sufficient strength.

What is claimed is:

1. A basic amino acid derivative represented by formula (1) or a salt thereof:

TABLE 1

| Liquid Organic Medium | Example 1 Compound of Manufacturing Example 1 | Example 2 Compound of Manufacturing Example 2 | Example 1 Compound of Manufacturing Example 3 | Comparative Example 1 12-Hydroxy stearic acid | Comparative Example 2 Lauroyl-L-glutamic acid dibutyl amide | Comparative Example 3 $N^\epsilon$-Octadecyl carbamoyl-$N^\omega$-lauroyl-lysine methyl ester | Comparative Example 4 $N^\epsilon$-Octadecyl carbamoyl-$N^\omega$-lauroyl-lysine ethyl ester |
|---|---|---|---|---|---|---|---|
| Methanol | Δ | oo | oo | not gelled | not gelled | oo | x |
| Benzene | O | oo | oo | — | oo | Δ | o |
| DMF | O | o | o | not gelled | x | o | Δ |
| DMSO | Oo | oo | oo | not gelled | x | oo | oo |
| CCl$_4$ | Oo | oo | Δ | oo | Δ | x | x |

It is apparent from Table 1 that, as compared with the conventional gelling agents, addition of small amount of the basic amino acid derivatives of the present invention is able to gel various kinds of liquid organic media.

Test Method 2

The same operation as in Test Method 1 was carried out and evaluation was conducted except that the compounds of the present invention (Manufacturing Examples 4 and 5)

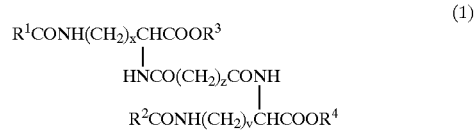

wherein $R^1$ and $R^2$ each independently is a straight-chain or branched-chain alkyl or alkenyl group having 5 to 21 carbon atoms, $R^3$ and $R^4$ each independently is an alkyl or alkenyl group having 1 to 22 carbon atom(s), hydrogen atom, alkaline metal or alkaline earth metal, wherein the alkyl or alkenyl group may be either in straight-chain or branched-chain or may have a cyclic structure, z is an integer of 0 or more and x and y each is an integer of 2 to 4.

2. The basic amino acid derivative according to claim 1, wherein z in formula (1) ranges from 0 to 10.

3. The basic amino acid according to claim 1, wherein z in formula (1) is 0.

4. The basic amino acid derivative according to claim 1, wherein each of $R^1$ and $R^2$ in formula (1) is a straight-chain alkyl group having 11 carbon atoms.

5. The basic amino acid derivative according to claim 1, wherein each of $R^3$ and $R^4$ in formula (1) is an alkaline metal or an alkaline earth metal.

6. A gelling agent or a solidifying agent comprising at least one basic amino acid derivative according to claim 1.

7. A gel comprising at least one basic amino acid derivative according to claim 1.

8. A perfumery or cosmetic comprising at least one basic amino acid derivative according to claim 1.

9. The basic amino acid derivative according to claim 1, wherein each of $R^1$ and $R^2$ independently is a straight-chain or branched-chain alkyl or alkenyl group having 7 to 11 carbon atoms.

10. The basic amino acid derivative according to claim 1, wherein at least one of $R^3$ and $R^4$ in formula (1) is an alkaline metal, wherein said alkaline metal is selected from the group consisting of sodium and potassium.

11. The basic amino acid derivative according to claim 1, wherein at least one of $R^3$ and $R^4$ in formula (1) is an alkaline earth metal, wherein said alkaline earth metal is selected from the group consisting of magnesium and calcium.

12. The gelling agent or a solidifying agent according to claim 6, further comprising at least one other gelling agent or solidifying agent selected from the group consisting of N-acyl-L-glutamic acid dialkylamide, polyamide resin, 12-hydroxystearic acid, sodium stearate, dibenzylidene-D-sorbitol, fatty acid dextrin, and gelatin.

13. The gelling agent or a solidifying agent according to claim 6, further comprising at least one surface-active agent selected from the group consisting of an anionic surface-active agent, a nonionic surface-active agent a cationic surface-active agent, and an amphoteric surface-active agent.

14. The gelling agent or a solidifying agent according to claim 6, further comprising at least one additive selected from the group consisting of an amino acid, a polyhydric alcohol, a water-soluble polymer, a sugar alcohol; a lower alcohol, an animal extract, a plant extract, a nucleic acid, a vitamin, an enzyme, an anti-inflammatory agent, a bactericide, an antiseptic, an antioxidant, an ultraviolet-absorber, a chelating agent, an antiperspirant, a pigment, a dye, an oxidation dye, an organic powder, an inorganic powders, a pH-adjusting agent, a pearling agent, and a moisturizer.

15. The gelling agent or a solidifying agent according to claim 6, further comprising at least one powder selected from the group consisting of a resin powder, Nylon powder, metal fatty acid soap, yellow iron oxide, red iron oxide, black iron oxide, chromium oxide, cobalt oxide, carbon black, ultramarine blue, Prussian blue, zinc oxide, titanium oxide, zirconium oxide, silicon oxide, aluminum oxide, cerium oxide, mica titanium, boron nitride, barium sulfate, calcium carbonate, magnesium carbonate, aluminum silicate, magnesium silicate, silicon carbide, pigment, lake, sericite, mica, talc, kaolin, barium sulfate with a plate shape, barium sulfate with a butterfly shape, fine particles of titanium oxide, fine particles of zinc oxide, fine particles of iron oxide and acylamino acid such as acyllysine, acylglutamic acid, acylarginine and acylglycine.

16. A method of gelling or solidifying a liquid organic medium comprising adding the basic amino acid derivative according to claim 1 to said liquid organic medium to obtain a mixture;

heating the mixture to obtain a homogeneous state; and incubating the mixture at ambient temperature.

17. The method according to claim 16, wherein the liquid organic medium comprises at least only liquid selected from the group consisting of mineral oil, animal oil, plant oil, a hydrocarbon, an ester, an ether, a cyclic ether, a ketone, an aldehyde, a lower alcohol, a silicone oil, a halogenated liquid, and highly polar organic solvent.

18. The method according to claim 16, wherein said heating is at a temperature ranging from 50 to 120° C.

19. The method according to claim 16, wherein said basic amino acid derivative is added at a concentration ranging from 1 to 400 parts by weight to 1000 parts by weight of the liquid medium.

20. The method according to claim 16, wherein said basic amino acid derivative is added at a concentration ranging from 1 to 200 pens by weight to 1000 parts by weight of the liquid medium.

* * * * *